(12) United States Patent
Pathak et al.

(10) Patent No.: US 8,271,561 B2
(45) Date of Patent: *Sep. 18, 2012

(54) OBJECT STRUCTURE-BASED SYSTEM AND METHOD FOR MANAGING INFORMATION

(75) Inventors: Hereen Pathak, Woburn, MA (US); Philip M. Irey, IV, Spotsylvania, VA (US)

(73) Assignee: Open Text S.A., Luxembourg (LU)

( * ) Notice: Subject to any disclaimer, the term of this patent is extended or adjusted under 35 U.S.C. 154(b) by 358 days.

This patent is subject to a terminal disclaimer.

(21) Appl. No.: 12/545,384

(22) Filed: Aug. 21, 2009

(65) Prior Publication Data
US 2010/0049774 A1    Feb. 25, 2010

Related U.S. Application Data

(63) Continuation of application No. 10/738,818, filed on Dec. 17, 2003, now Pat. No. 7,603,371.

(60) Provisional application No. 60/434,189, filed on Dec. 17, 2002.

(51) Int. Cl.
*G06F 17/30* (2006.01)

(52) U.S. Cl. .......... 707/830; 707/802; 707/796

(58) Field of Classification Search .......... 707/830, 707/803, 802, 796
See application file for complete search history.

(56) References Cited

U.S. PATENT DOCUMENTS

| | | | |
|---|---|---|---|
| 5,138,615 A | 8/1992 | Lamport et al. | |
| 5,202,982 A | 4/1993 | Gramlich et al. | |
| 5,473,772 A | 12/1995 | Halliwell et al. | |
| 5,504,879 A | 4/1996 | Eisenberg et al. | |
| 5,623,592 A * | 4/1997 | Carlson et al. | 715/866 |
| 5,630,125 A | 5/1997 | Zellweger | |
| 5,634,124 A * | 5/1997 | Khoyi et al. | 1/1 |
| 5,649,186 A | 7/1997 | Ferguson | |
| 5,655,130 A | 8/1997 | Dodge et al. | |
| 5,694,595 A | 12/1997 | Jacobs et al. | |
| 5,740,430 A | 4/1998 | Rosenberg et al. | |
| 5,752,021 A | 5/1998 | Nakatsuyama et al. | |
| 5,778,400 A | 7/1998 | Tateno | |
| 5,799,324 A * | 8/1998 | McNutt et al. | 1/1 |
| 5,875,334 A | 2/1999 | Chow et al. | |
| 5,875,441 A | 2/1999 | Nakatsuyama | |

(Continued)

FOREIGN PATENT DOCUMENTS
EP    0 601 550 A2    6/1994

OTHER PUBLICATIONS

Office Action issued in U.S. Appl. No. 10/738,818, mailed Jun. 1, 2006, 10 pages.

(Continued)

*Primary Examiner* — Phuong Thao Cao
(74) *Attorney, Agent, or Firm* — Sprinkle IP Law Group

(57) ABSTRACT

A software product comprising a set of computer instructions stored on a computer readable medium and executable by a computer processor to maintain a profile object representing profile data, receive a first command based on the profile object to access an attribute value, and access the attribute value. The profile object can include at least one profile section that acts as a container for attributes and at least one attribute for each profile section. The attributes can essentially be variables having a name and a value.

20 Claims, 6 Drawing Sheets

U.S. PATENT DOCUMENTS

| | | | |
|---|---|---|---|
| 5,881,308 | A | 3/1999 | Dwyer, III |
| 5,893,109 | A | 4/1999 | DeRose et al. |
| 5,920,879 | A | 7/1999 | Kyojima et al. |
| 5,940,822 | A | 8/1999 | Haderle et al. |
| 5,940,842 | A | 8/1999 | Sakuta |
| 5,956,726 | A | 9/1999 | Aoyama et al. |
| 5,970,490 | A | 10/1999 | Morgenstern |
| 5,991,735 | A * | 11/1999 | Gerace .................... 705/7.33 |
| 6,009,436 | A | 12/1999 | Motoyama et al. |
| 6,012,098 | A | 1/2000 | Bayeh et al. |
| 6,018,710 | A | 1/2000 | Wynblatt et al. |
| 6,023,714 | A | 2/2000 | Hill et al. |
| 6,047,280 | A | 4/2000 | Ashby et al. |
| 6,052,693 | A | 4/2000 | Smith et al. |
| 6,055,538 | A | 4/2000 | Kessenich et al. |
| 6,072,801 | A | 6/2000 | Wood, Jr. et al. |
| 6,098,071 | A | 8/2000 | Aoyama et al. |
| 6,108,676 | A | 8/2000 | Nakatsuyama |
| 6,128,617 | A | 10/2000 | Lowry |
| 6,134,559 | A | 10/2000 | Brumme et al. |
| 6,195,709 | B1 * | 2/2001 | Gupner et al. ............... 719/316 |
| 6,339,826 | B2 * | 1/2002 | Hayes et al. ............... 713/166 |
| 6,343,287 | B1 * | 1/2002 | Kumar et al. ..................... 1/1 |
| 6,519,571 | B1 | 2/2003 | Guheen et al. |
| 6,694,375 | B1 * | 2/2004 | Beddus et al. ............... 709/249 |
| 6,714,935 | B1 * | 3/2004 | Delo ........................... 707/803 |
| 7,603,371 | B1 | 10/2009 | Pathak |
| 2002/0016962 | A1 * | 2/2002 | DeCarmo ..................... 725/28 |
| 2002/0059201 | A1 * | 5/2002 | Work ............................. 707/3 |
| 2002/0091745 | A1 | 7/2002 | Ramamurthy et al. |
| 2002/0111994 | A1 * | 8/2002 | Raghunandan ............... 709/203 |
| 2002/0124243 | A1 * | 9/2002 | Broeksteeg et al. ........... 717/168 |
| 2002/0147857 | A1 * | 10/2002 | Sanchez et al. ............... 709/316 |
| 2002/0152237 | A1 | 10/2002 | Cohen et al. |
| 2006/0248187 | A1 * | 11/2006 | Thorpe et al. ................. 709/224 |

OTHER PUBLICATIONS

Office Action issued in U.S. Appl. No. 10/738,818, mailed Dec. 21, 2006, 12 pages.

Office Action issued in U.S. Appl. No. 10/738,818, mailed Jun. 21, 2007, 11 pages.

Office Action issued in U.S. Appl. No. 10/738,818, mailed Dec. 11, 2007, 9 pages.

Office Action issued in U.S. Appl. No. 10/738,818, mailed May 29, 2008, 11 pages.

* cited by examiner

| VISITOR ID | GENERAL | | WEALTH | GROUP |
|---|---|---|---|---|
| v01 | NAME="Joe Regular" | Address="15 Main Street, Anytown, USA" | INCOME=5 | BIG_SPENDER= Null |
| v02 | NAME="Alice Brown" | Address="100 Happy Street, Happyville, USA" | INCOME=10 | OLD=Null RICH=Null |

| VISITOR ID | NAME | ADDRESS |
|---|---|---|
| v01 | "Joe Regular" | "15 Main Street, Anytown, USA" |
| v02 | "Alice Brown" | "100 Happy Street, Happyville, USA" |

| VISITOR ID | ATTRIBUTE | VALUE |
|---|---|---|
| v01 | Name | "Joe Regular" |
| v01 | Address | "15 Main Street, Anytown, USA" |
| v02 | Name | "Alice Brown" |
| v02 | Address | "100 Happy Street, Happyville, USA" |

| VISITOR ID | PROFILE SECTION | WEB | PHONE |
|---|---|---|---|
| v01 | books | 20 | 0 |
| v01 | books:fiction | 16 | 0 |
| v01 | books:reference | 4 | 0 |
| v01 | books:reference:textbooks | 3 | 0 |
| v01 | books:reference:dictionaries | 1 | 0 |
| v02 | books | 10 | 0 |
| ⋮ | | | |
| v10 | books | 15 | 7 | ns and methods.

OBJECT STRUCTURE-BASED SYSTEM AND METHOD FOR MANAGING INFORMATION

RELATED APPLICATIONS

This application claims priority under 35 U.S.C. §120 to U.S. patent application Ser. No. 10/738,818, patented as U.S. Pat. No. 7,603,371, entitled "OBJECT BASED SYSTEM AND METHOD FOR MANAGING INFORMATION" by Pathak et al., filed Dec. 17, 2003, which in turns claims priority under 35 U.S.C. 119(e) to U.S. Provisional Patent No. 60/434,189, entitled "OBJECT-STRUCTURE-BASED SYSTEM AND METHOD FOR MANAGING PROFILE INFORMATION" by Irey et al., filed Dec. 17, 2002, which is hereby fully incorporated by reference herein.

TECHNICAL FIELD

Embodiments of the present invention relate to management of information. More particularly, embodiments of the present invention relate to object based management of information. Even more particularly, embodiments of the present invention relate to object based management of visitor profile information.

BACKGROUND OF THE INVENTION

Communication of data over computer networks, particularly the Internet, has become an important, if not essential, way for many organizations and individuals to disseminate information. The Internet is a global network connecting millions of computers using a client-server architecture in which any computer connected to the Internet can potentially receive data from and send data to any other computer connected to the Internet. The Internet provides a variety methods in which to communicate data, one of the most ubiquitous of which is the World Wide Web. Other methods for communicating data over the Internet include e-mail, usenet newsgroups, telnet and FTP.

The World Wide Web is a system of Internet servers, typically called "web servers", that support documents formatted according to the hypertext markup language ("HTML"). These documents, known as web pages, are transferred across the Internet according to the Hypertext Transfer Protocol ("HTTP"). Web pages are often organized into web sites that represent a site or location on the world wide web. The web pages within a web site can link to one or more web pages (or files) at the same web site or at other web sites. A user can access web pages using a browser program and can "click on" links in the web pages being viewed to access other web pages. Each time the user clicks on a link, the browser program generates an HTTP request and communicates it to web server hosting the web page. The web server retrieves the requested web page and returns the web page to the browser program. The returned web page can provide a variety of information, often referred to as content, including text, graphics, audio and video content. The content of a web site can inform and entertain visitors, provide a mechanism for carrying out transactions, and guide a user's web browsing experience.

Because web pages can display information and receive information from users, web sites have become popular for enabling commercial transactions. As web sites become more important to commerce, businesses are increasingly interested in managing information related to visitors and content. Capturing and managing visitor profile information is critical for many facets of e-commerce (e.g., E-marketing, personalization). In prior art systems, data related to web site visitors is typically stored as individual fields or as records. These systems are deficient, however, because they lead to inefficient data storage and management.

In systems in which data is stored in individual fields, the fields are typically not related together in any meaningful sense for the management of visitor profile information. In these systems, there is typically a one to one correlation between the method by which data is accessed and the storage format. In other words, each application accessing the information would maintain its own copy of the information. If a large number visitors are accessing a web site and purchasing products, this can lead to redundant storage of vast amounts of data.

In record based systems, each application accessing the user information maintains a user profile as a record having particular fields. While fields are related together through records, each application that accesses the user profile information typically still maintains its own record, leading to redundant records. Moreover, each record will typically contain all the fields defined for the record, whether or not there is a value associated with the field. If, for example, a user profile record is configured to keep track of each product that a user has purchased, the record will contain a field for every product available over the web site and a value indicating whether the corresponding product has been purchased. As the number of fields in the record increases, the amount of storage also increases.

Some existing database systems employ object-to-relational mapping to provide a mapping of data stored in a database. In these systems, each application accessing data in the database is configured with an object that maps particular attributes to the underlying database. Redundant data storage can be reduced as various applications can apply the mapping to access the same pieces of underlying data. These systems are deficient for visitor profile management, however, because each application applies the mapping separately. If the data storage schema changes for visitor profile information, each application accessing the visitor profile data must be updated.

Moreover, object-to-relational mappings typically only address storage of data in relational databases. User profile information, however, can be stored in a variety of data storage locations including memory locations, database locations, directory locations, files and so on.

SUMMARY OF THE INVENTION

Embodiments of the present invention provide systems and methods of managing content that may substantially eliminate or reduce the disadvantages of previously developed profile management systems and methods.

Embodiments of the present invention provide software products and methods for providing an object-based approach to management of profile data. In one embodiment of the present invention, a profile management product can maintain a profile object that represents underlying profile data. The profile object can provide a uniform addressing syntax through which applications can access or modify the underlying profile data, without exposing the underlying storage mechanism and format. This approach allows profile data to span multiple tables, databases and even non-relational sources such as lightweight directory access protocol ("LDAP") directories, service advertising protocol ("SAP") tables or other data storage formats known in the art. Additionally, this approach allows the data storage semantic (i.e., where and how the underlying profile data is stored) to change without changing the applications themselves.

More particularly, one embodiment of the present invention provides a software product comprising a set of computer instructions stored on a computer readable medium. The computer instructions can be executable by a computer processor to maintain a profile object representing profile data, the profile object comprising, receive a first command based on the profile object to access an attribute value and access the attribute value. The profile object can include at least one profile section that acts as a container for attributes and at least one attribute for each profile section. The attributes can essentially be variables having a name and a value.

Another embodiment of the present invention can include a method comprising: maintaining a profile object representing profile data, receiving a first command based on the profile object to access an attribute value and accessing the attribute value. The profile object can include at least one profile section that acts as a container for attributes and at least one attribute for each profile section. The attributes can essentially be variables having a name and a value.

Yet another embodiment of the present invention can include a software product comprising computer instructions stored on a computer readable medium, executable to maintain a profile object representing visitor profile data for visitors to a web site, receive a first command based on the profile object from an application to access an attribute value from the visitor profile data, access the attribute value, and return the attribute value to the application. The profile object can include at least one profile section that acts as a container for attributes and at least one attribute for each profile section. The attributes can essentially be variables having a name and a value.

Embodiments of the present invention provide an advantage over prior art profile management systems and methods by providing a profile object that provides a uniform addressing syntax for underlying profile data. Because the profile object provides an addressing syntax, applications can access and/or modify the attribute values without maintaining awareness of how or where the attribute values are stored.

Embodiments of the present invention provide another advantage over prior art profile management systems by allowing the storage semantic for profile data to change without requiring changes to the applications that process the profile management data.

Embodiments of the present invention provide yet another advantage over prior art profile management systems and methods by allowing profile data to be stored across a variety of data storage formats.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the present invention are illustrated in the FIGURES, like numerals being used to refer to like and corresponding parts of the various drawings.

Embodiments of the present invention provide software products and methods for providing an object-based approach to management of profile data. In one embodiment of the present invention, a profile management product can maintain a profile object that represents underlying profile data. The profile object can provide a uniform addressing syntax through which applications can access or modify the underlying profile data without exposing the underlying storage mechanism and format. This approach allows profile data to span multiple tables, databases and even non-relational sources, such as lightweight directory access protocol ("LDAP") directories, service advertising protocol ("SAP") tables or other data storage formats known in the art. Additionally, this approach allows the data storage semantic (i.e., where and how the underlying profile data is stored) to change without changing the applications themselves.

Figure 1:
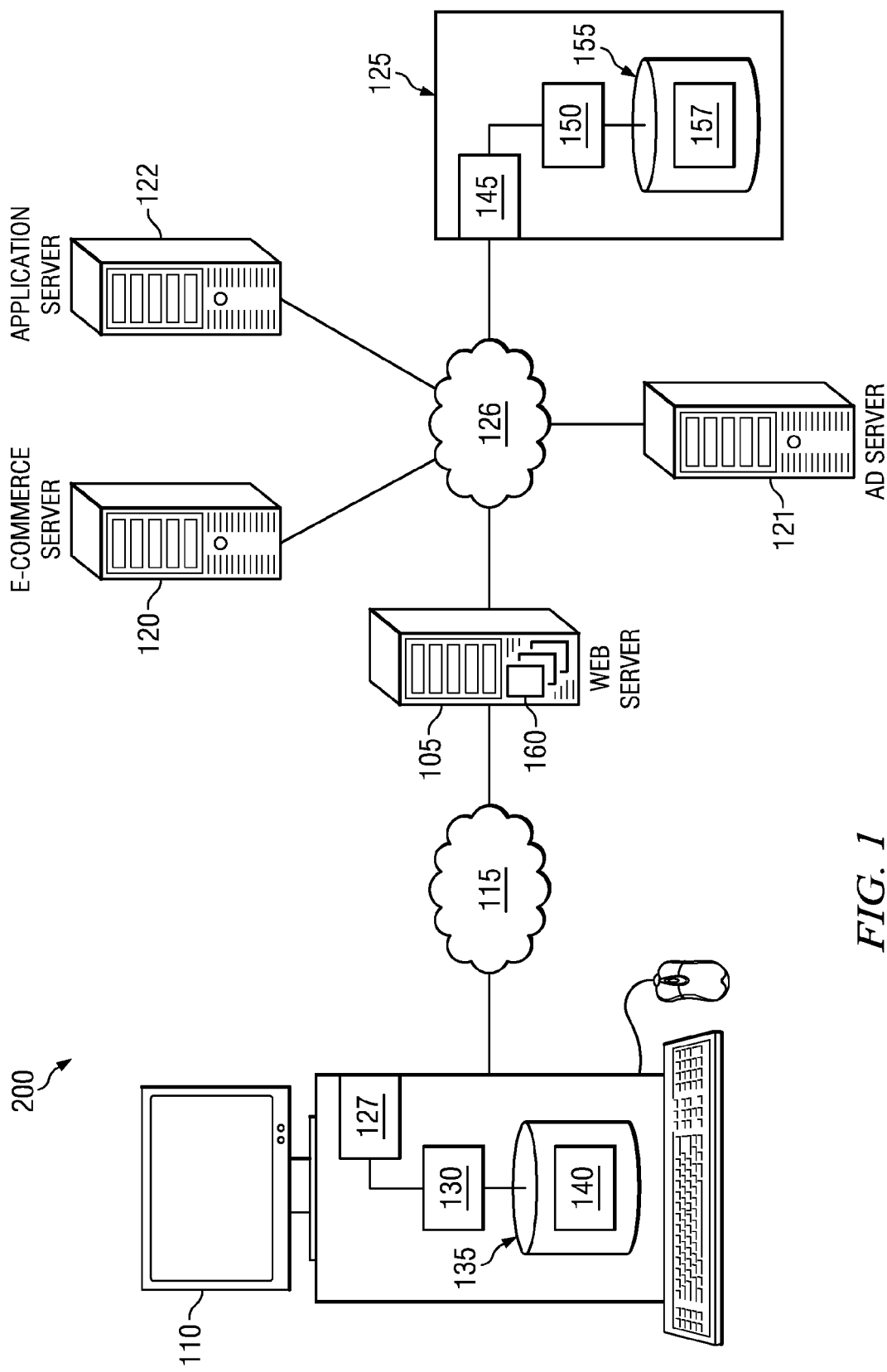
FIG. 1 is a diagrammatic representation of one embodiment of a system for gathering and managing profile information.

FIG. 1 is a diagrammatic representation of a system 100 for gathering and managing profile information. In FIG. 1, a web server 105 connects to a client computer 110 via network 115, which can be a global computer network such as the Internet, a local area network ("LAN"), a wide area network ("WAN"), a wireless network or any computer network known in the art. Web server 105 can also connect to additional servers, such as, for example, e-commerce server 120, ad server 121, an application server 122 and a management system 125 via, for example, a second network (e.g., a LAN) 126.

Client computer 110 can include a network interface 127 (e.g., an internal or external modem, Ethernet adapter or other network interface device known in the art) to connect to and interface with network 115, a CPU 130 and a computer readable storage medium 135 (e.g., RAM, ROM, optical storage medium, magnetic storage medium or any other computer readable memory known in the art). Additionally, client computer 110 can include one or more input devices (e.g., keyboard, mouse, voice activated input or other input device known in the art) and one or more displays. Computer readable storage medium 135 can store a browser program 140 that can be executable by CPU 130 to allow a user, through the use of the input and display devices, to request and view web pages over network 115. Examples of browser programs include Netscape Navigator™, (Netscape and Netscape Navigator are trademarks of Netscape Communications Corporation of Mountain View, Calif.) and Microsoft Internet Explorer™ (Microsoft and Microsoft Internet Explorer are trademarks of Redmond Wash. based Microsoft Corporation).

Likewise, management system 125 can include a network interface 145 (e.g., an internal or external modem, Ethernet adapter or other network interface device known in the art) to connect to and interface with network 126, a CPU 150 and a computer readable storage medium 155 (e.g., RAM, ROM, optical storage medium, magnetic storage medium or any other computer readable memory known in the art). Computer readable storage medium 155 can store computer instructions 157 ("profile management program 157") executable by CPU 150 to manage profile information.

Although not shown for clarity, each of web server 105, e-commerce server 120, ad server 121 and application server 122 can include computer components such as network interfaces, memories, processors and other computer components and software known in the art. Additionally, each of web server 105, e-commerce server 120, ad server 121 and application server 122 can contain software applications that can communicate with profile management program 157.

In operation, web server 105 can host a web site 160 that can comprise one or more web pages. A user, via browser program 140, can generate a request, such as an HTTP GET request for a web page hosted by web server 105. Web server 105 can retrieve the web page and communicate the web page to browser 140 for review by a user. Included in the web page can be text, graphics, audio content and video content.

Additionally, the web server can initiate scripts to insert dynamic content into the web page or carry out back end business processes. For example, if dynamic content is included in the requested web page, web server 105 can execute a common gateway interface ("CGI") to send information to application server 122 to generate the content (e.g., according to .jsp, asp, or .p scripts). Application server 122 will generate the content and send the content back to web server 105. Web server 105 can then serve the requested web page.

As a user browses web site 160 by requesting additional pages, web server 105 can initiate other events at e-commerce server 120, ad server 121, and application server 122. For example, if web site 160 is a commercial web site offering products for sale, e-commerce server 120 may update the state of a shopping cart based on information provided by a user. Or, ad server 121 can dynamically generate advertisements for insertion into the content of a requested web page. The initiation of various events, including the generation of dynamic content according to various scripts (e.g., .jsp, asp, .pl, or other script known in the art) and backend business processes based on HTTP requests would be understood by those of ordinary skill in the art as being common activities in enterprise and commercial web pages.

The user can be considered a "visitor" to the web site. The visitor may provide various pieces of information, such as the visitor's name, address, income, credit card number, or any other information that can be provided by a user or gathered by software applications based on a user's interactions with a web site. Additionally, various systems, such as e-commerce server 120 and application server 122 can keep track of information related to a user's activities on a site, such as content viewed, products purchased and other visitor information. Thus, various systems can gather profile information about visitors, content and usage patterns.

Profile management program 157, according to one embodiment of the present invention, can provide an object-based approach to accessing, storing and tracking profile information (e.g., visitor profile information, content profile information, usage information). Profile management program 157 can maintain a profile object representing underlying profile data. The profile object provides a uniform addressing syntax to reference individual pieces of information, without exposing the underlying storage mechanism and format. Other applications (e.g., applications at e-commerce server 120) can issue commands to profile management program 157, based on the profile object, to access or modify the underlying profile data. This approach allows profile data to span multiple tables, databases and even non-relational sources such as LDAP directories, SAP tables or other data storage formats known in the art.

Figures 2, 3A, 3B:
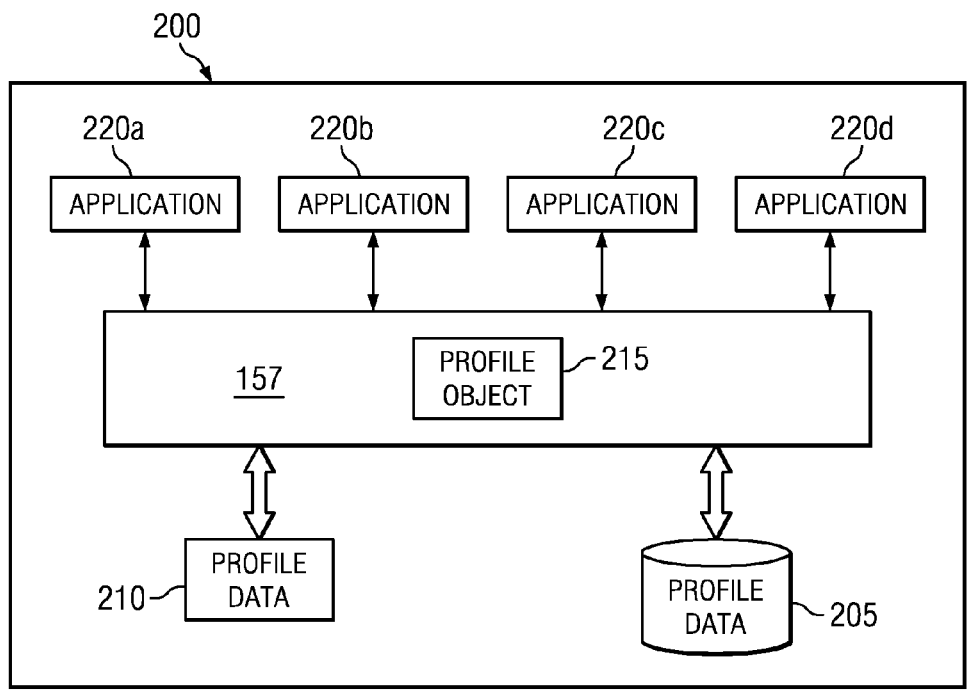
FIG. 2 is a diagrammatic representation of an architecture for profile management according to one embodiment of the present invention.
FIG. 3A is a diagrammatic representation of a record structure for a profile object, according to one embodiment of the present invention.
FIG. 3B is a diagrammatic representation of a database table for storing attribute values in a column-based format.

FIG. 2 is a diagrammatic representation of an architecture 200 for profile management according to one embodiment of the present invention. In architecture 200, profile management program 157 can manage information related to user's in, for example, database 205, memory 210 (e.g., RAM) and/or in any other data storage location known in the art. Profile management program 157, can define an object (e.g., profile object 215) that provides a uniform addressing syntax for the information stored in database 205 and/or memory 210.

The profile object can include one or more profile sections, each of which can be a programmatic container for one or more attributes. An attribute can essentially be a variable that has an assigned name and a corresponding value. The profile section can define the attributes and the storage semantic for the attribute values (i.e., where and how the attribute values are stored). For example, if an attribute of a profile section is "NAME", the profile section can specify that the value "Joe Regular" is stored in a particular place in database 205. Additionally, a profile section can specify caching strategies for the attribute values or other factors that affect the performance of accessing and updating attribute values for attributes defined by the object. It should be noted that a profile section can be an attribute of another profile section. Thus, profile sections can include nested profile sections.

The attribute values underlying the profile object can be stored in database 205, memory 210 and or any other data storage location, depending on the storage semantic defined by profile management program 157. In one embodiment of the present invention, each attribute can be assigned a name that it is unique within a profile section. Example attribute types include, but are not limited to, 1-byte integer, 2-byte integer, 4-byte integer, 4-byte float, 8-byte double, string, date, datetime.

The profile object can be organized, by way of example, but not limitation, as a record structure, a tree structure, a list, an array or in any other suitable profile object structure as would be understood by one of ordinary skill in the art. Examples of profile objects are discussed in conjunction with FIGS. 3 and 4.

As an example of profile sections and attributes, profile management program 157 can maintain profile sections having attributes shown in example Table 1:

TABLE 1

| Profile Section | Attribute |
|---|---|
| General | NAME |
|  | ADDRESS |
| WEALTH | INCOME |
| SEGMENTS | BIG_SPENDER |
|  | OLD |
|  | RICH |

For two example visitors, v01 and v02, example attribute values are shown in Table 2:

|  |  | General | Wealth | Segment |
|---|---|---|---|---|
| VISITORID = v01 | NAME = "Joe Regular" | ADDRESS = "15 Main Street, Anytown, USA" | INCOME = 5 | BIG_SPENDER = Null |
| VISITORID = v02 | NAME = "Alice Brown" | ADDRESS = "100 Happy Street, Happyville, USA" | INCOME = 10 | OLD = NULL<br>RICH = NULL |

In this example, three profile sections are defined, General, Wealth and Segment. For both visitors, the General section contains two attributes, NAME and ADDRESS. These two attributes can be of the type string. The Wealth section contains only one attribute defined for visitor v01 and v02, INCOME, which is a 1-byte integer type value. Finally, the Segment section has different attributes defined visitor v01 and visitor v02. For the visitor v01 the section has the BIG_SPENDER attribute. For visitor vO2, the section contains the attributes OLD and RICH. All these attributes are of the type string and, in this example, have the value of "NULL".

Profile sections can be designated as persistent or non-persistent. In persistent sections, changes to attribute values are immediately propagated to underlying database 205 or other storage location. In non-persistent sections, changes to attribute values do not affect underlying database 205. Additionally, profile sections can be designated as "read only", meaning that data can be accessed, but not modified, through the profile section. This feature ensures important profile information cannot be changed by some or all applications accessing the profile data, but still allows modification by other applications with sufficient permission to modify the underlying storage structure (e.g., a financial services institution publishes a credit score profile to support applications offering loans via web and e-mail and application processing of the loan applications via the web and telephone, but wants to ensure those applications cannot actually modify the calculated data).

One or more applications (e.g., content management applications, e-commerce applications, business applications and/or any application known in the art), represented as applications 220a-220d, can interface with profile management program 157, through, for example, an application protocol interface ("API"). Profile management program 157 can be responsive to commands based on the syntax of the profile object (i.e., profile section names and attribute names). The commands can allow applications to retrieve information about the profile sections and/or attributes and to access and/or modify underlying attribute values.

As an example of providing information about the profile object, profile management program 157 can be responsive to a GetSectionName command to return the names of profile sections defined in the profile object. As another example, profile management program 157 can be responsive to a GetAttributename(profile section) command to return the names of attributes in a specified profile section. Other information that profile management program 157 can return includes, for example, whether the attribute values for a profile section are stored in a row based database format or a column based database format, whether a profile section is persistent, whether a section is read-only, whether a section is user visible and/or user editable.

Profile management program 157 can also be responsive to commands for retrieving and/or modifying attribute values in the profile sections. For example, profile management program 157 can be responsive to a getValues command, specifying a user identification, profile section and attribute names as the command's arguments, to retrieve particular attribute values. Using the examples of Table 1 and Table 2, profile management program 157 can be responsive to the command getValues(v01:wealth:income) to return the value of 5 for the income of visitor 1. The returned attribute value can then be processed by the requesting application. For example, if application 220a is a content management application, content management application 220a can issue the getValues (v01:wealth:income) command, receive the value 5 in response, and serve the content appropriate for the income level to visitor 1.

As another example, profile management program 157 can be responsive to a setValues command, specifying the visitor identification, profile section name(s), attribute name(s) and attribute values as the arguments, to set the particular attribute values. If application 220b is an application that collects user information from web based forms, application 220b may receive a new address (e.g., "22 Park Street, Anytown, USA") for visitor 1. Application 22b can then issue the command setValues(v01:general:address="22 Park Street, Anytown USA") to update the address information. Profile management program 157 can propagate the change to the attribute value to underlying database 205 or memory 210, depending on the storage semantic specified by the profile object.

In the foregoing examples, content management application 220a and application 220b do not need to know where or how the underlying attribute values are stored (e.g., whether they are stored in memory 210 or database 205). Instead, content management application 220a and application 220b can access the attribute values through profile management commands based on the addressing syntax provided by profile object 215 (i.e., the profile sections and attributes). Profile management program 157, can carry out the operations of accessing, storing or modifying the underlying data attribute values in memory 210 and/or database 205 in response to the commands.

Thus, profile management program 157 can, in essence, act as an abstraction layer for profile data stored in a database, memory location or other data storage location known in the art. Applications configured to access and/or modify attribute values through profile management program 157 do not need to maintain knowledge of the storage semantic of the underlying data (i.e., they do not need to be aware of where or how the data is stored). This allows the storage semantic to be changed without requiring modifications to each of the applications. Moreover, as the multiple applications can access and/or modify the underlying data through the profile object provided by profile management program 157, only one set of data needs to be stored for the multiple applications, though redundant data can be stored if it is more efficient from a data access perspective.

Table 3 lists example commands that can be carried out by profile management program 157.

TABLE 3

| Command | Description |
| --- | --- |
| getSections | Returns the names of the defined profile sections or the nested profile sections in a specified profile section. |
| getSectionProperties | Returns the values for various properties including, but not limited to: UserEditable, UserVisible, Persistent, Read-Only. |
| getAttributes | Returns the attribute names and types in a specified profile section. |
| getProfileElements | Returns profile section names, attribute names and attribute types in the specified profile section. |
| getAttributeTypes | Returns the profile section names, attribute names and attribute types in the specified profile section. |
| loadSections | Loads into memory the specified profile sections for a specified visitor. |
| deleteVisitorinSection | Deletes the specified visitor from the specified profile section. |
| uploadVisitor | Removes the specified visitor from memory. Note that the visitor will continue to have an entry in the underlying database. |
| uploadVisitorinSection | Removes from memory the specified visitor in the specified profile section. |
| getValues | Retrieves attribute values and types for a visitor based on a specified visitor identification and attribute names. |
| getAllValues | Retrieves all attribute values and types for a specified visitor. |
| setValues | Allows multiple attribute values to be set in one request. The command specifies the visitor, the attributes to be updated, and the attribute values. |
| sumValues/addValues | Allows attribute values to be increased or decremented in one request. The command specifies a visitor, attributes to be incremented or decremented and a "value to add". The profile management program will attempt to increment (or decrement) the values of the specified attributes by the "value to add". |
| deleteAttribute | Deletes a specified attribute for a specified visitor. |
| Min/Max | Find the Minimum or Maximum value of a specified attribute in profile sections. |
| Reset | Reloads attribute values for a specified visitor from a database to memory. |

It should be noted that the commands listed in Table 3 are provided by way of example, and profile management program 157 can be configured to be responsive to any number of commands using any suitable nomenclature, as would be understood by those of ordinary skill in the art.

It should be further noted that profile management program 157 can include processes for memory management to make accessing and/or modifying data more efficient.

Profile management program 157, in one embodiment of the present invention, can automatically load attribute values associated with profile sections into memory 210 when it needs to perform an operation on one or more of the attribute values. Profile management program 157 can also be responsive to, for example, a loadSections command from an application that explicitly specifies which profile section is to be loaded into memory. In another embodiment of the present invention, profile management program 157 can automatically load profile sections into memory that are likely to be accessed or modified, in response to a particular user visiting a web site. In other words, profile management program 157 can cache attribute values in anticipation of accessing or modifying those values.

While, in FIGS. 1 and 2, the profile management program is depicted as a separate software component, the profile management program can be implemented in any suitable programming language according to any suitable software architecture known in the art. For example, the profile management program can be a standalone program, a module of larger program, a "plugin" of a program, or other software component. Additionally, profile management program can implement any number of additional features such as security features to prevent particular applications from accessing and/or modifying attribute values.

FIG. 3A is a diagrammatic representation of a record structure 300 for profile object 215 of FIG. 2. Using the examples of Table 1 and Table 2, the profile object can represent data for two visitors. In this example, the profile object has three profile sections: general, wealth and segments. General, Wealth and Segment. For both visitors, the General section contains two attributes, NAME and ADDRESS. These two attributes can be of the type string. The Wealth section contains only one attribute defined for visitor v01 and visitor v02, INCOME, which is a 1-byte integer type value. Finally, the Segment section has different attributes defined visitors v01 and v02. For the visitor v01 the section has the BIG_SPENDER attribute. For visitor v02, the section contains the attributes OLD and RICH. All these attributes are of the type string and, in this example, have the value of "NULL".

Attribute values can be accessed and/or modified, in on embodiment of the present invention, through commands that reference the record structure and visitor. Each profile section can have a fully qualified ("FQ") name based on the record structure. For example the FQ name for the income attribute value of visitor 1 can be v01:wealth:income. It should be noted that this nomenclature system is provided by way of example only, and any suitable nomenclature system can be used for accessing attribute values and/or profile object information.

Figures 3C, 4A:
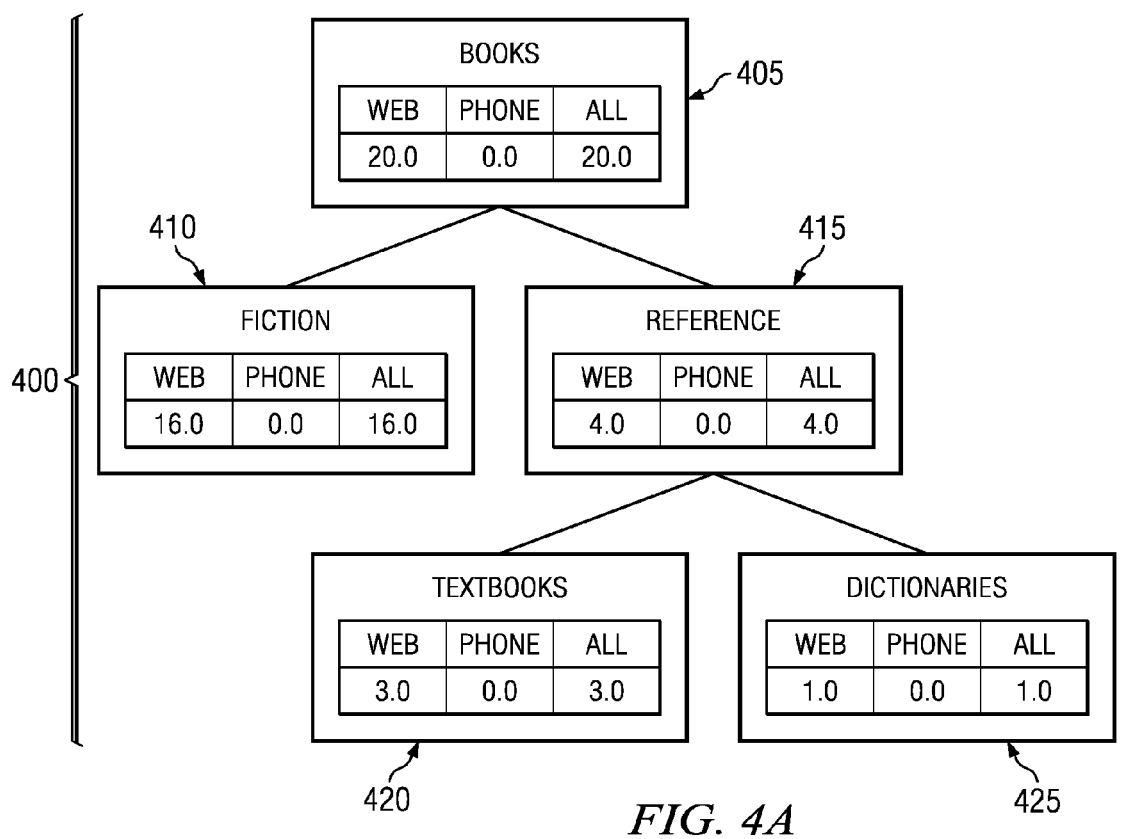
FIG. 3C is a diagrammatic representation of a database table for storing attribute values in a row-based format.
FIG. 4A is a diagrammatic representation of a tree structure for a profile object, according to one embodiment of the present invention.

The attribute values, in one embodiment of the present invention, can be stored in an underlying database (e.g., database 205 of FIG. 2) either in column-based or row-based manner. When data is stored in the column-based manner, the values for each attribute are stored in a separate column. FIG. 3B is a diagrammatic representation of a database table 305 for storing attribute values associated with the General profile section in a column-based format. When the data is stored in a row-based format, it can be stored in the table with columns for the visitor identification, the attribute and the value. FIG. 3C is a diagrammatic representation of a database table 310 for storing attribute values associated with the General profile section in a row-based format. The advantage of storing profile section data in a row-based table versus a column-based table is the conservation of storage space gained when defining different attributes for different visitors.

According to one embodiment of the present invention, the profile management program can receive metadata specifying initial values for attributes within a profile section. Additionally, new rows can be inserted as the result of visitors making requests to a web site. These requests can specify a value for the visitor identification provided by, for example, a visitor identification or tracking service. One embodiment of a system for identifying visitors is described in U.S. patent application Ser. No. 10/616,408 entitled "Method and System for Site Visitor Information", by Artz et al, filed Jul. 9, 2003, which is hereby fully incorporated by reference herein.

Various commands can result in a new database row. For example, if getValues, getAllValues, setValues, or sumValues from Table 3 are invoked specifying a visitor identification that is not in the underlying database, memory or other storage location, the profile management program can create a new entry for this visitor, populate the columns with initial values and return a value for the attribute specified in a getValue request.

FIG. 4A is a diagrammatic representation of a tree structure 400 for a profile object, according to one embodiment of the present invention. In the example of FIG. 4A, tree structure 400 can be used to represent the types of books purchased by a visitor (e.g., visitor v01 from the above examples). Tree structure profile object 400 allows numeric data associated with a profile to be represented in hierarchically organized categories. As with the record structure, tree structure profile object 400 includes profile sections and attributes.

According to one embodiment of the present invention, each profile section can be assigned a name that is unique among the profile sections siblings in the tree. In other words, each profile section at a particular level in the tree structure hierarchy can have a unique name. A profile section can be identified by its FQ name. The root profile section's fully qualified name is, for example, its name. Any other profile sections fully qualified name can be a string that consists of the parent profile sections qualified name and the particular profile section's name. As example, the FQ name for a grandchild profile section can be "root:child:grandchild."

In the example of FIG. 4, the following profile sections are illustrated: Books 405, Fiction 410, Reference 415, Textbooks 420 and Dictionaries 425. In this example, the FQ name for Books profile section 405 can be "Books", the FQ name for Fiction profile section 410 can be "Books:Fiction", the FQ name for Reference profile section 415 can be "Books:Reference", the FQ name for Textbooks profile section 420 can be "Books:Reference:Textbooks" and the FQ name for Dictionaries profile section 425 can be "Books:Reference:Dictionaries". It should be noted that this nomenclature system is provided by way of example only, and any tree suitable tree structure and nomenclature system can be utilized.

Each profile section can contain one or more attributes. According to one embodiment of the present invention, the number and names of the attributes are the same in each profile section. Additionally, attributes for each profile section in a tree structure can be of the same type (e.g., 2-byte integer, 4-byte integer, 8-byte float, string or other attribute type). In the example of FIG. 4, each profile section contains the attributes Web, Phone and All. The underlying attribute values can be stored in a database, in memory, and/or in any other data storage location known in the art.

Figures 4B, 4C:
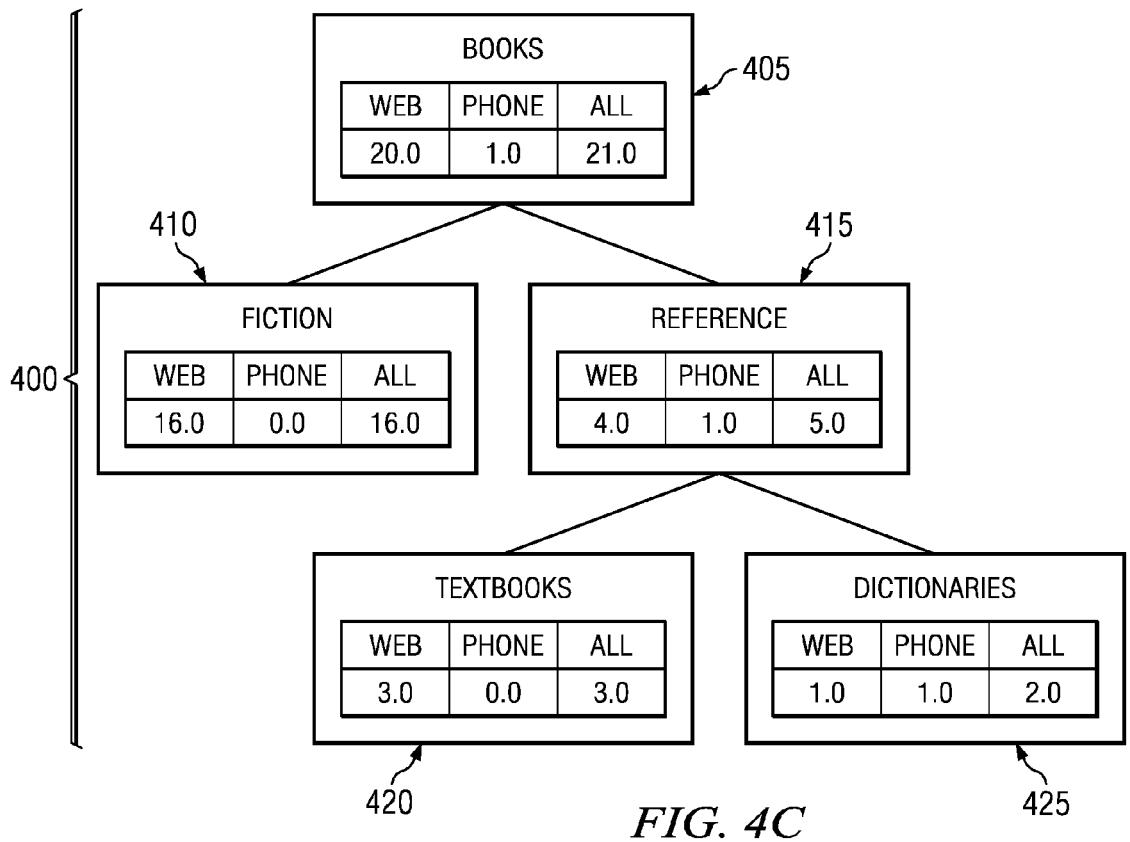
FIG. 4B illustrates an example of a database table storing attribute values, according to one embodiment of the present invention.
FIG. 4C is a diagrammatic representation of a tree structure in which changes are propagated up the tree structure, according to one embodiment of the present invention.

As an example, the attribute values for Web and Phone can be stored in a database having a column for visitor ids, a column containing profile section names, a column for values for the web attribute and the phone attribute. An example of a database table 430 storing attribute values for attributes in tree structure 400 and for other visitors is illustrated in FIG. 4B. In this case, the attribute values for All are not stored in the database, but instead, can be stored in transient memory. The attribute values for All can be calculated by the profile management program when a particular profile section is loaded into memory.

The profile management program can be responsive to various commands to access and/or modify data associated with tree structure. For example, the profile management program can be responsive to a getAttributeNames command to get the names of all the attributes in tree structure 400. Additionally, the profile management program can be responsive to a getAttributes command that specifies a visitor identification (e.g., v01), a profile section (e.g., "books:fiction") and one or more attribute names to retrieve attribute values for the specified attributes.

The profile management program can also include an addValue command to allow adding a specified value to an attribute value in a specified profile section. To add a value, an application can issue an addValue command to the profile management program that specifies the visitor identification, the profile section names, the attributes and the value to be added. In one embodiment of the present invention, the behavior of the profile management program in response to the addValue command can depend on the value of a PROPAGATE property associated with tree structure 400. If the PROPAGATE property is set to FALSE, the addition an subtraction only changes values in the specified profile section. If on the other hand, the PROPAGATE value is set to TRUE, the addition or subtraction can be propagated up to higher level profile sections.

Figure 4D:
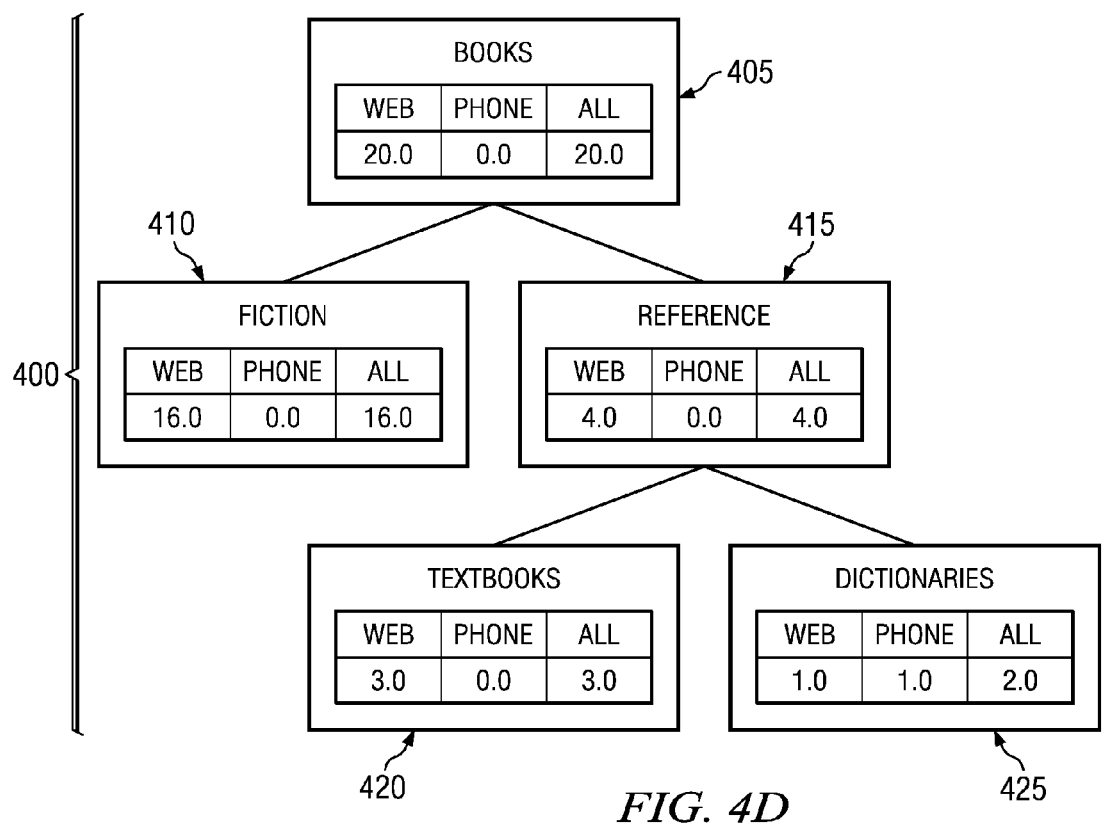
FIG. 4D is a diagrammatic representation of a tree structure in which changes are not propagated up the tree structure, according to one embodiment of the present invention.

As an example, if an application issues the command addValue(v01,Books:Reference:Dictionaries,Phone,1.0), the profile management program can add 1.0 to the attribute value for the Phone attribute in Dictionary profile section 425. Prior to the addition, tree structure 400 and associated attribute values can appear as shown in FIG. 4A. After the addition, and if the PROPAGATE parameter is set to TRUE, tree structure 400 and associated attribute values can be represented as shown in FIG. 4C. If, however, the PROPAGATE parameter is set to FALSE, tree structure 400 and associated attribute values can be represented as shown in FIG. 4D. In this case, the changes made by the profile management program in response to the addValue command are not propagated up the tree structure.

The profile management program can also be responsive to Min/Max commands. An application can issue a Max or Min command specifying a visitor identification, profile section, attribute and how many ordered maximum or minimum values to get. In response, the profile management program can return the maximum value for the attribute from the specified profile section or any of its children.

It should be noted that the commands described above are provided by way of example, and the profile management program, can be configured to be responsive to any number of commands using any suitable nomenclature, as would be understood by those of ordinary skill in the art.

Figure 5:
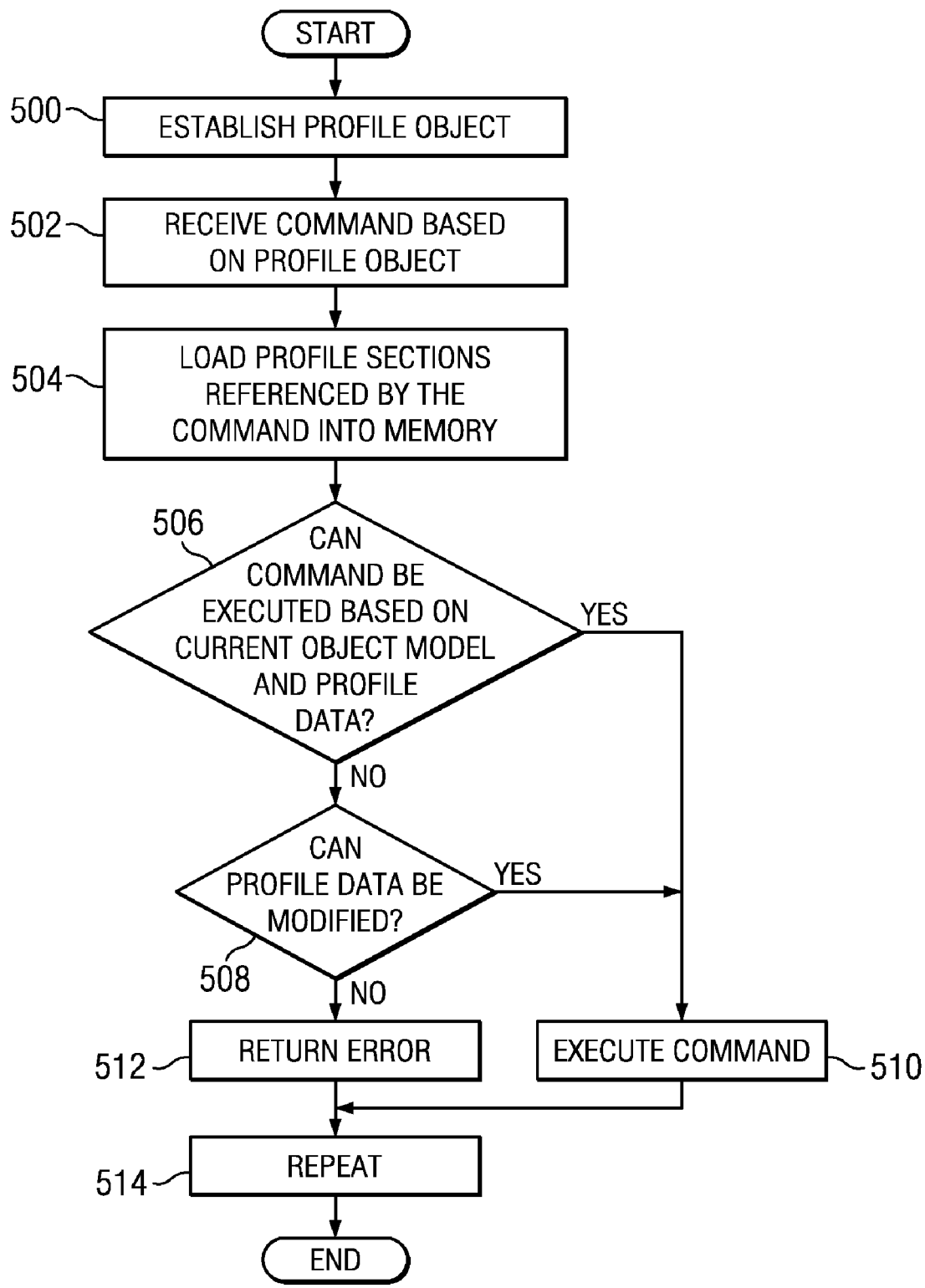
FIG. 5 is a flow chart illustrating one embodiment of a method for managing profile data.

FIG. 5 is a flow chart illustrating one embodiment of a method for managing profile data. At step 500, a profile object for a set of underlying profile data can be established. The profile object can specify profile sections and attributes. Each attribute can have corresponding attribute values stored in a data storage location, such as a database location, a memory location, a LDAP directory location, a SAP table location and/or any other data storage location known in the art. The profile object can provide an abstraction of the underlying profile data that can be used by various applications to access and/or modify the profile data.

At step 502, the profile management program can receive a command based on the profile object to access or modify attribute values. For more efficient processing, the profile management program, at step 504, can load the attribute values and/or profile object information (e.g., profile section names, attribute names, profile section properties) into memory locations from other data storage locations. In another embodiment of the present invention, the profile management program can preload the attribute values and profile object information into memory locations according to any caching scheme in the art.

The profile management program, at step 506, can determine if the command can be executed based on the current profile object information and attribute values. For example, if the getValues command is received that specifies a visitor identification that does not exist in the underlying database or memory location, the profile management program can determine that the command can not be executed on the current set of profile data. Therefore, at step 508, the profile management program can determine if the profile data can be modified such that the command can be executed. Continuing with the previous example, if the visitor specified in the getValues command is not contained in the profile data, the profile management program can create the visitor identification and populate the profile sections for that visitor with default or predetermined values. The profile management program can be arbitrarily configured to modify the profile data in order to execute particular commands.

If, at step 508, the profile management program determines that the profile data can be modified such that the command can be executed, or the command can be executed on the existing profile data (as determined at step 506), the profile management program, at step 510 can execute the command. Otherwise, the profile management program, at step 512, can return an error to the requesting application. Steps 500-512 can optionally be repeated (step 514).

While the profile management program is primarily described in context of managing visitor profile data, it should be noted that the profile management program can manage a variety of profile data including profile data on other types of users (e.g., profile data on administrators), on content, on applications and/or on portlets. For example, profile management program can create a profile object for derived content metadata (e.g., data that profiles which particular pieces of content are used or viewed), such as the number of times a type of content item is viewed for any given day of the week or hour of the day (using a tree-based profile) or the number of times and categories of portlets (or applications) that a user accesses.

As can be understood from the foregoing, embodiments of the present invention provide a software product that can maintain a profile object of profile data. The profile object can include profile sections and attributes. There can be one or more attributes for each profile section and an attribute can, itself, be a profile section. The software product can receive a command from an application based on the profile object and access an attribute value based on the command. The software product can then communicate the attribute value back to the application issuing the command. Additionally, the software product can modify attribute values based on commands from applications.

The profile data can stored in multiple relational and non-relational sources such as, for example, databases, according to an LDAP directories, SAP structures, memory locations and other data storage locations known in the art. Because the software product can represent the profile data as a profile object, applications other than the profile management software product do not need to be aware of how or where the data is stored. In other words, the applications do not need to be aware of the data storage semantic for the profile data. This can allow the data storage semantic to be changed without changing the applications themselves.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of this invention as claimed below.

What is claimed is:

1. An object-based profile management system, comprising:
   a network interface configured to connect to and interface with a first network where one or more servers reside, where at least one web site is hosted by one of the servers, and wherein the at least one web site is accessible by users via user computers over a second network;
   a central processing unit coupled to said network interface; and
   a computer readable storage medium storing computer instructions executable by the central processing unit to:
      manage a profile object representing profile data related to user activity on the at least one web site, wherein the profile object provides a uniform addressing syntax, wherein the uniform addressing syntax comprises one or more profile sections each defining one or more attributes, and a storage semantic specifying storage information for attribute values for the one or more attributes, wherein the storage information comprises a data format and location for the attribute values;
      receive a profile management command based on the uniform addressing syntax; and
      retrieve the profile data referenced by the profile management command, wherein the uniform addressing syntax enables the profile data to be stored across multiple data storage locations, wherein the multiple data storage locations store data in different formats.

2. The object-based profile management system of claim 1, wherein the profile data referenced by the profile management command comprises information provided by one or more of the one or more profile sections or the one or more attributes of the profile object referencing the profile data related to the user activity on the at least one web site.

3. The object-based profile management system of claim 1, if the profile data does not include an entry for a user, create a new entry for the user in response to the profile management command and populate the attribute values for the one or more attributes with initial values.

4. The object-based profile management system of claim 3, wherein said populating the attribute values for the one or more attributes with initial values comprises receiving one or more metadata containing the initial values.

5. The object-based profile management system of claim 1, wherein the computer readable storage medium stores computer instructions further executable by the central processing unit to:
change the storage semantic of the uniform addressing syntax.

6. The object-based profile management system of claim 1, wherein each profile section is designated as persistent or non-persistent; and
wherein changes to attribute values in profile sections designated as persistent are immediately propagated to a database, a memory, or a storage location where the attribute values reside.

7. The object-based profile management system of claim 1, wherein the multiple data storage locations include one or more non-relational data storage locations.

8. The object-based profile management system of claim 1, wherein each profile section is assigned a name that is unique among one or more profile sections defined by the profile object; and
wherein each of the one or more attributes is assigned a unique name within a profile section.

9. The object-based profile management system of claim 1, wherein at least one of the one or more attributes is a nested profile section.

10. The object-based profile management system of claim 1,
wherein the profile management command contains an identification of a user and at least one profile section or attribute defined in the profile object; and
wherein said retrieving the profile data referenced by the profile management command comprises retrieving the profile data referenced by the profile management command using the identification of the user and the at least one profile section or attribute.

11. A method of object-based profile management, comprising:
at an object-based profile management computer residing on a first network, managing a profile object representing profile data related to user activity on the-at least one web site, wherein the at least one web site is hosted by a server computer coupled to the object-based profile management computer over the first network, wherein the web site is accessible by users via user computers over a second network, wherein the profile object provides a uniform addressing syntax, wherein the uniform addressing syntax comprises one or more profile sections each defining one or more attributes, and a storage semantic specifying storage information for attribute values for the one or more attributes, wherein the storage information comprises a data format and location for the attribute values;
at the object-based profile management computer, receiving a profile management command from an application running on the first network, wherein the profile management command is based on the uniform addressing syntax; and
at the object-based profile management computer, retrieving the profile data referenced by the profile management command, wherein the uniform addressing syntax enables the profile data to be stored across multiple data storage locations, wherein the multiple data storage locations store data in different formats.

12. The method of claim 11, wherein the profile data referenced by the profile management command comprises information provided by one or more of the one or more profile sections or the one or more attributes of the profile object referencing the profile data related to the user activity on the at least one web site.

13. The method of claim 11,
wherein each profile section is assigned a name that is unique among one or more profile sections defined by the profile object; and
wherein each of the one or more attributes is assigned a unique name within a profile section.

14. The method of claim 11, further comprising:
changing the storage semantic of the uniform addressing syntax.

15. The method of claim 11,
wherein each profile section is designated as persistent or non-persistent; and
wherein changes to attribute values in profile sections designated as persistent are immediately propagated to a database, a memory, or a storage location where the attribute values reside.

16. The method of claim 11,
wherein the profile management command contains an identification of a user and at least one profile section or attribute defined in the profile object; and
wherein said retrieving the profile data referenced by the profile management command comprises retrieving the profile data referenced by the profile management command using the identification of the user and the at least one profile section or attribute.

17. A computer readable storage medium storing computer instructions executable by a processor to:
at an object-based profile management computer residing on a first network, manage a profile object representing profile data related to user activity on the-at least one web site, wherein the at least one web site is hosted by a server computer coupled to the object-based profile management computer over the first network, wherein the web site is accessible by users via user computers over a second network, wherein the profile object provides a uniform addressing syntax, wherein the uniform addressing syntax comprises one or more profile sections each defining one or more attributes, and a storage semantic specifying storage information for attribute values for the one or more attributes, wherein the storage information comprises a data format and location for the attribute values;
at the object-based profile management computer, receive a profile management command from an application running on the first network, wherein the profile management command is based on the uniform addressing syntax; and at the object-based profile management computer, retrieve the profile data referenced by the profile management command, wherein the uniform addressing syntax enables the profile data to be stored across multiple data storage locations, wherein the multiple data storage locations store data in different formats.

18. The computer readable storage medium of claim 17, wherein the profile data referenced by the profile management command comprises information provided by one or more of the one or more profile sections or the one or more attributes of the profile object referencing the profile data related to the user activity on the at least one web site.

19. The computer readable storage medium of claim 17,
   wherein each profile section is assigned a name that is unique among one or more profile sections defined by the profile object; and wherein each of the one or more attributes is assigned a unique name within a profile section.

20. The computer readable storage medium of claim 17,
   wherein the profile management command contains an identification of a user and at least one profile section or attribute defined in the profile object; and wherein said retrieving the profile data referenced by the profile management command comprises retrieving the profile data referenced by the profile management command using the identification of the user and the at least one profile section or attribute.

* * * * *